(12) United States Patent
Hodrus

(10) Patent No.: US 10,968,965 B2
(45) Date of Patent: Apr. 6, 2021

(54) METHOD FOR DETERMINING AN ACTUATOR PATH OF A HYDRAULIC CLUTCH ACTUATOR

(71) Applicant: Schaeffler Technologies AG & Co. KG, Herzogenaurach (DE)

(72) Inventor: Erhard Hodrus, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 116 days.

(21) Appl. No.: 16/305,428

(22) PCT Filed: Jun. 20, 2017

(86) PCT No.: PCT/DE2017/100519
§ 371 (c)(1),
(2) Date: Nov. 29, 2018

(87) PCT Pub. No.: WO2018/010720
PCT Pub. Date: Jan. 18, 2018

(65) Prior Publication Data
US 2020/0318697 A1    Oct. 8, 2020

(30) Foreign Application Priority Data

Jul. 14, 2016  (DE) .......................... 102016212843.4
Aug. 16, 2016  (DE) .......................... 102016215180.0

(51) Int. Cl.
*F16D 48/06* (2006.01)

(52) U.S. Cl.
CPC ...... *F16D 48/06* (2013.01); *F16D 2500/1026* (2013.01); *F16D 2500/302* (2013.01);
(Continued)

(58) Field of Classification Search
CPC .............. F16D 48/06; F16D 2500/302; F16D 2500/3168; F16D 2500/1026; F16D 2500/5016
See application file for complete search history.

(56) References Cited

U.S. PATENT DOCUMENTS 7,588,368 B2     9/2009  Hagen et al.
2001/0035323 A1* 11/2001  Porter .................... F16D 48/04
                                                              192/35
(Continued)

FOREIGN PATENT DOCUMENTS

DE     19602006 A1     1/1996
DE     19723393 A1    12/1997
(Continued)

OTHER PUBLICATIONS

Anonymous, Micronas Introduces Hall Effect Sensors with PWM and SENT Interfaces for Reliable Signal Transmission in Automobiles, Trade News-0806, May 8, 2008.

*Primary Examiner* — David J Hlavka
(74) *Attorney, Agent, or Firm* — Reid Baldwin

(57) ABSTRACT

A method for determining an actuator path of a hydraulic clutch actuator, includes measuring a first temperature of the hydraulic clutch actuator with a first temperature sensor, measuring a second temperature of the hydraulic clutch actuator with a second temperature sensor, calculating a first temperature difference between the first temperature and the second temperature, using the first temperature or the second temperature as a clutch actuator temperature to determine a compensation value of the actuator path when the first temperature difference is less than a threshold value, and modifying the actuator path using the compensation value. In an example embodiment, the first temperature sensor measures a one of a circuit board temperature, an angle sensor temperature or a pressure sensor temperature, and the (Continued)

second temperature sensor measures another one of the circuit board temperature, the angle sensor temperature or the pressure sensor temperature.

8 Claims, 2 Drawing Sheets

(52) U.S. Cl.
CPC ............. *F16D 2500/3168* (2013.01); *F16D 2500/5016* (2013.01)

(56) References Cited

U.S. PATENT DOCUMENTS

2009/0218190 A1* 9/2009 Reuschel ............. F16D 25/088
    192/85.63
2013/0345940 A1* 12/2013 Redbrandt ............. F16D 48/06
    701/53

FOREIGN PATENT DOCUMENTS

| DE | 10155459 | A1 | 11/2001 |
| DE | 10155462 | A1 | 6/2002 |
| DE | 102004006730 | A1 | 8/2004 |
| DE | 102005029566 | A1 | 2/2006 |
| DE | 102005061080 | A1 | 7/2006 |
| DE | 102010051153 | A1 | 6/2011 |
| DE | 102011079889 | A1 | 2/2012 |
| DE | 102011085750 | A1 | 5/2012 |
| DE | 10225262 | B4 | 10/2013 |
| DE | 102014215753 | A1 | 3/2015 |
| DE | 102014219029 | A1 | 3/2016 |
| DE | 102015210176 | A1 | 12/2016 |
| DE | 102015213297 | A1 | 1/2017 |

* cited by examiner

METHOD FOR DETERMINING AN ACTUATOR PATH OF A HYDRAULIC CLUTCH ACTUATOR

CROSS-REFERENCE TO RELATED APPLICATIONS

This application is the United States National Phase of PCT Appln. No. PCT/DE2017/100519 filed Jun. 20, 2017, which claims priority to German Application Nos. DE 102016215180.0 filed Aug. 16, 2016 and DE 102016212843.4 filed Jul. 14, 2016, the entire disclosures of which are incorporated by reference herein.

TECHNICAL FIELD

The disclosure relates to a method for determining an actuator path of a hydraulic clutch actuator, e.g., for activating a clutch of a vehicle that is closed when not actuated, wherein the actuator path is modified as a function of a temperature of the clutch actuator.

BACKGROUND

In modern motor vehicles, especially in passenger cars, automated clutches that employ a hydrostatic clutch actuator are increasingly being used. A hydrostatic clutch actuator of this type has a master cylinder, in which a master piston is mounted such that it can be moved axially. The electromotively driven master piston of the master cylinder pressurizes a hydraulic fluid that is disposed in a hydrostatic transmission path, wherein a slave piston of a slave cylinder is moved, and its movement is transmitted to the clutch, whereupon the clutch is opened.

A method and a device for controlling a clutch actuator for actuating a clutch, preferably a clutch that is closed when not actuated, are known for a motor vehicle from DE 10 2014 219 029 A1. The clutch actuator can traverse a maximum path to actuate the master cylinder in order to displace the slave cylinder via the hydrostatic transmission path and completely open the clutch. The release path of the slave piston on the slave cylinder is likewise limited. It is known that the maximum path of the clutch actuator is reduced so that, when the temperature increases, the slave cylinder cannot be displaced further than is permitted. In so doing, the slave cylinder is protected from destruction. It should therefore be assumed that, in the event of a rise in temperature, during which the hydraulic fluid expands, the actuator path is displaced by compensation in such a way that the expansion is counteracted. A similar process occurs when the fluid contracts during cooling.

It is known that the temperature of the hydraulic fluid is estimated and that a compensation value for the actuator path is calculated with the estimated temperature of the hydraulic fluid. When the hydraulic fluid warms up, it expands; this is why the actuator path is reduced with the compensation. In order for the temperature to be estimated correctly, the signals that are used to calculate the fluid temperature of the hydraulic fluid must be correct. For example, the circuit board temperature of the hydrostatic actuator is thus used. Apart from electrical errors, only the range in which the circuit board temperature lies, e.g. the range from −40° C. to +150° C., is tested to determine the circuit board temperature of the hydrostatic clutch actuator.

SUMMARY

The disclosure addresses the problem of indicating a method for determining an actuator path of a hydrostatic clutch actuator, for which a correctly measured temperature value is taken as the basis for the temperature of the clutch actuator.

According to the disclosure, the temperature of the clutch actuator is measured by means of three temperature sensors during the clutch actuator operation. A temperature difference is determined from each two of the temperatures measured by the temperature sensors, and one value of the three temperature differences determined in this way is compared with a temperature threshold value. The measured temperature, the value of the temperature difference of which is lower than the temperature threshold value, is used as the temperature of the clutch actuator to determine a compensation value of the actuator path. This offers the advantage that, by using the temperature currently prevailing in the clutch actuator while it is operating, a temperature that was subjected to a plausibility check by comparing the temperature differences with a temperature threshold value is selected as the temperature of the clutch actuator. The use of a plausibility-checked temperature value such as this allows an exact determination of a compensation value of the clutch actuator to be made.

A circuit board temperature, an angle sensor temperature and a pressure sensor temperature in the clutch actuator can be measured by the temperature sensors. These sensors are installed in very different positions in the clutch actuator and thus provide an overview of the temperature conditions at different points in the clutch actuator.

In one embodiment, the circuit board temperature is used to determine the compensation value of the actuator path when the value of the temperature difference between the circuit board temperature and angle sensor temperature and/or the value of the temperature difference between the circuit board temperature and the pressure sensor temperature are smaller than the temperature threshold value. The maximum availability of the temperature ascribed to the hydrostatic actuator is thereby ensured.

In one development, the circuit board temperature is established as the temperature of the clutch actuator when the values of the temperature difference between the circuit board temperature and the angle sensor temperature and the temperature difference between the circuit board temperature and the pressure sensor temperature are both smaller than the temperature threshold value. This results in a double plausibility check of the circuit board temperature.

In one variant, the angle sensor temperature is used to determine the compensation value of the actuator path when the value of the temperature difference between the angle sensor temperature and the pressure sensor temperature is smaller than the given temperature threshold value. If the comparison of the temperature differences should show that both the circuit board temperature and the angle sensor temperature satisfy the prescribed criteria, then the circuit board temperature receives a higher priority than the angle sensor temperature, and so the circuit board temperature then serves as the basis for the temperature of the clutch actuator to determine the compensation value of the actuator path.

In one embodiment, the angle sensor temperature is used to determine the compensation value of the actuator path when the value of the temperature difference between the circuit board temperature and the angle sensor temperature and/or the value of the temperature difference between the circuit board temperature and the pressure sensor temperature are/is greater than the temperature threshold value. In this way, it is reliably ascertained that the circuit board temperature is implausible and unsuitable for further processing.

In order to avoid jumps in the transition from the circuit board temperature to the angle sensor temperature as the assumed temperature of the clutch actuator when processing the temperature of the clutch actuator, a rate of change for the temperature of the clutch actuator is selected to be very small during a transition from the circuit board temperature to the angle sensor temperature as the temperature of the clutch actuator.

Advantageously, the temperature of the clutch actuator is detected by a weighting of the circuit board temperature and/or the angle sensor temperature and/or the pressure sensor temperature, wherein the influence of the respectively measured temperature is limited by the plausibility check. By means of this weighting, the temperature of the clutch actuator can be calculated from the circuit board temperature and the angle sensor temperature, for example.

In one embodiment, 0% of a non-plausibility-checked measured temperature is included in the determination of the compensation value of the actuator path, and 100% of a plausibility-checked measured temperature is included, wherein a transition from 0% to 100% of the respective measured temperature occurs continuously. This prevents the result calculated from them from having jumps.

In one embodiment, the weighting of a measured temperature is reduced when it was repeatedly not possible to check its plausibility. It is assumed in this instance that the temperature sensor is faulty.

BRIEF DESCRIPTION OF THE DRAWINGS

The disclosure allows for numerous embodiments. One of these will be explained in greater detail on the basis of the figures shown in the drawing.

The following is shown.

DETAILED DESCRIPTION

Figure 1:
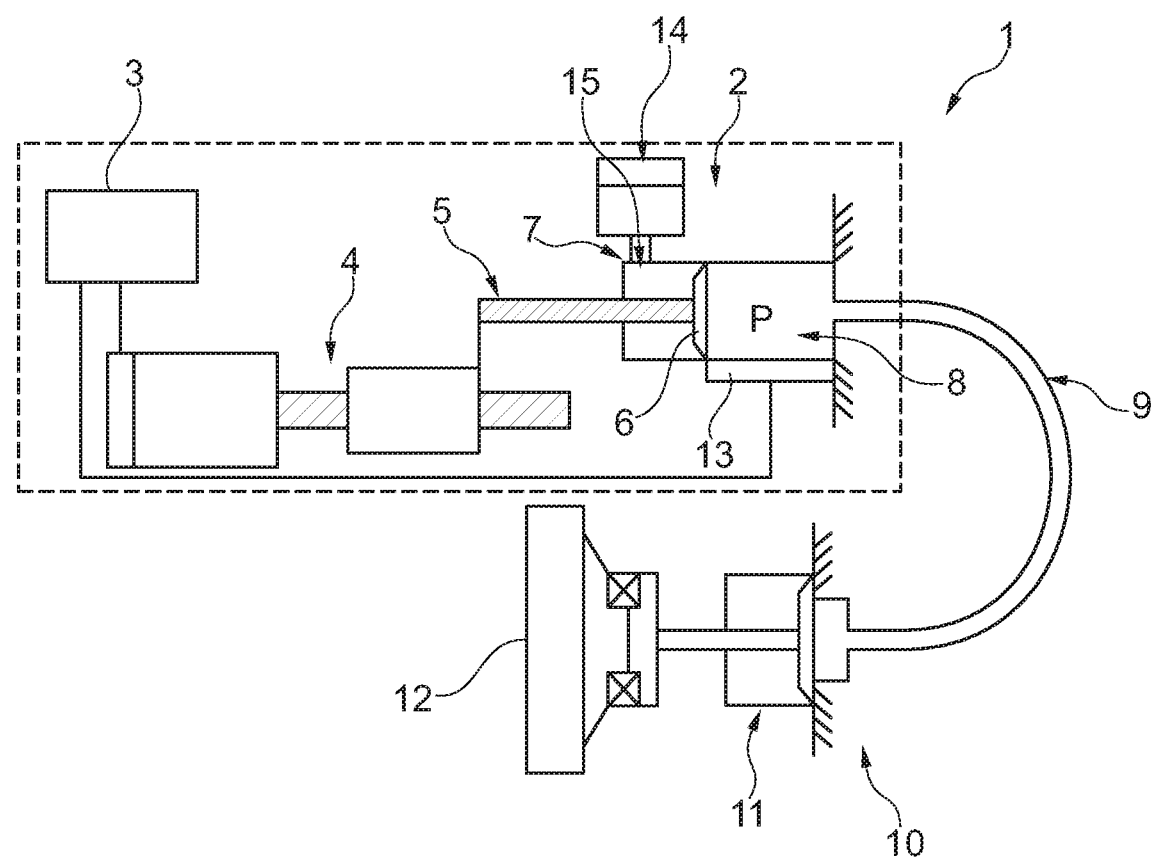
FIG. 1 is a schematic diagram of a clutch actuation system in a vehicle.

FIG. 1 shows a design of a hydrostatic clutch actuation system 1 for use in a vehicle. On the master side 2, the hydrostatic clutch actuation system 1 has an actuator control device 3, which activates a hydrostatic clutch actuator 4. The clutch actuator 4 is kinematically connected to a piston 6 of a master cylinder 7 via a drive 5. When the clutch actuator 4 and thus the piston 6 in the master cylinder 7 are displaced to the right along the actuator path, a volume of the master cylinder 7 is changed, as a result of which a pressure p is built up in the master cylinder 7 and is transmitted via a hydraulic fluid 8 through a hydraulic line 9 to the slave side 10 of the hydrostatic clutch actuation system 1. On the slave side 10, the pressure p of the hydraulic fluid 8 in a slave cylinder 11 causes a path change, which is transmitted to a clutch 12 so as to actuate it. The clutch 12 is a clutch that is open in the unactuated state, such as those used as a hybrid separating clutch in hybrid vehicles. for example.

The distance along the actuator path traversed by the piston 6 of the master cylinder 7 is detected by a position sensor 13. The master cylinder 7 is connected to an equalization tank 14, wherein a connection opening 15 of the master cylinder 7 is unblocked by the piston 6 of the master cylinder 7 when the piston 6 is in a predetermined position.

To prevent the destruction of the clutch actuation system 1, the fluid temperature of the hydraulic fluid 8 is determined as a function of an actuator temperature and is calculated with the aid of a temperature model. Using the fluid temperature of the hydraulic fluid 8, a compensation value of the release path of the clutch actuator 4 is identified. Here, a circuit board temperature is used as the temperature of the clutch actuator 4 and is subjected to a plausibility check with the aid of an angle sensor temperature and a pressure sensor temperature, all three of which are measured in the hydrostatic clutch actuator 4. This calculation occurs in the actuator control device 3, in which the temperature model for calculating the fluid temperature of the hydraulic fluid 8 is stored. However, the temperature of the clutch actuator 4 can also be calculated on a drive control device, which is superordinate to the actuator control device 3, when said drive control device is provided with the corresponding temperature signals by the actuator control device 3.

Figure 2:
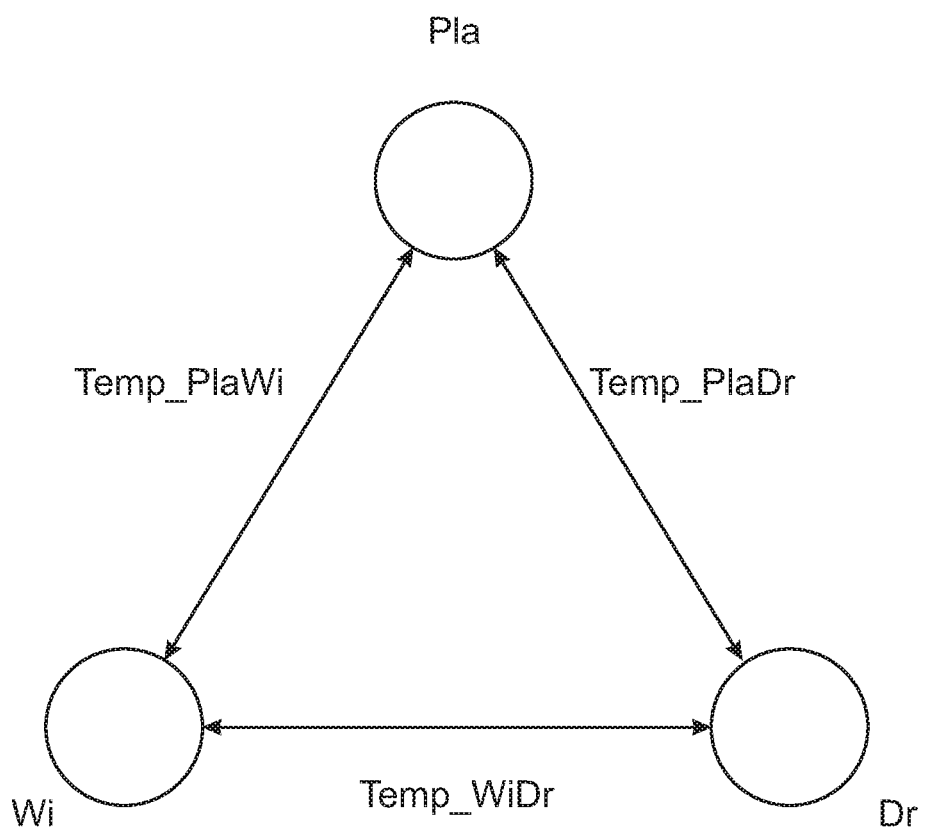
FIG. 2 is a schematic diagram of the calculation of the temperature differences in the measured temperatures in a clutch actuator.

Various temperature sensors that are not further shown, such as a temperature sensor for determining a circuit board temperature, a temperature sensor for determining an angle sensor temperature and a temperature sensor for determining a pressure sensor temperature, are provided in the clutch actuator 4. While the clutch actuator 4 is operating, the temperatures of these three aforementioned temperature sensors are checked against each other for plausibility in the actuator control device 3. This plausibility check occurs in that temperature differences are continuously calculated from the temperatures measured by the three temperature sensors, as is shown in FIG. 2. A first temperature difference Temp_PlaWi is identified here between the circuit board temperature Pla and the angle sensor temperature Wi. At the same time, a second temperature difference Temp_PlaDr is identified between the circuit board temperature Pla and the pressure sensor temperature Dr. Moreover, a third temperature difference Temp_WiDr is identified from the angle sensor temperature and the pressure sensor temperature. The values of these differences are reflected in Table 1.

TABLE 1

| | Sensor | | |
|---|---|---|---|
| Value of the Difference | Circuit board temperature (Pla) | Angle sensor temperature (Wi) | Pressure sensor temperature (Dr) |
| Temp_PlaWi | x | x | — |
| Temp_WiDr | — | x | x |
| Temp_PlaDr | x | — | x |

An "x" denotes that the respective temperature signal is used; a "-" denotes that the temperature signal is not used. The abbreviation "Temp" already includes the value of the difference, although this is not explicitly indicated.

The individual values calculated from the temperatures provided by the temperature sensors are each compared with a temperature threshold value. A plausibility-checked temperature value is always provided when the value of the difference is smaller than the respective temperature threshold value. If a value of the temperature difference with the circuit board temperature Temp_PlaWi or Temp_PlaDr lies below the respective temperature threshold value, the circuit board temperature is used as the temperature of the hydrostatic clutch actuator 4. If the temperature difference Temp_WiDr also simultaneously lies below the threshold value, then the circuit board temperature is given priority ahead of the angle sensor temperature, and the circuit board temperature is fed into the temperature model to calculate the fluid temperature. Only if the value of the temperature difference Temp_WiDr lies below the respective temperature threshold value is the angle sensor temperature used as the temperature of the clutch actuator 4. The maximum availability of the temperature values is thereby ensured.

If it is found during the plausibility check that it is necessary to switch from the heretofore plausible circuit board temperature to the angle sensor temperature as the temperature of the clutch actuator 4 as a result of an absent plausibility check, the transition from the circuit board temperature to the angle sensor temperature occurs at a low rate of change. This is necessary in particular because the calculated plausibility-checked temperature signal is supposed to be used to determine the actuator position.

A temperature change should not take place too quickly, and therefore a gradient limit is introduced for the temperature signal. In order to initialize the temperature signal uniquely for each ignition cycle, this limit must briefly be deliberately deactivated.

The plausibility check can also be carried out with an active signal, such as the circuit board temperature, which is then used as the temperature of the clutch actuator 4 when the values of the temperature differences Temp_PlaWi and Temp_PlaDr are both smaller than the temperature threshold value. If this is not the case, the circuit board temperature is no longer used.

Alternatively, the temperature for the clutch actuator 4 can also be obtained from a weighting of the circuit board temperature, the pressure sensor temperature and the angle sensor temperature. The weighting is designed such that the influence on the calculation of the temperature of the hydraulic fluid 8 is 0% when there is an implausible or invalid signal, whereas the influence is 100% for a valid and thus plausible signal. In this process, the transition from 0% to 100% of the respective temperature should occur continuously and, therefore, the temperature signal calculated from it should not include any jumps. If multiple signals for the circuit board temperature and the angle sensor temperature are 100% available, it is possible to implement a weighting between them that depends, for example, on the temperature range in which they occur, since the tolerances of the various temperature sensors develop differently at different temperatures, or since particular sensors are systematically less trustworthy in particular ranges.

The weighting factors can also depend upon the status of the temperature signals. If a temperature signal is more frequently invalid, then the weighting factor can be reduced. This kind of memory allows bad sensors to be separated out and their signals to no longer be used.

The proposed method permits a calculation of the temperature of the clutch actuator from plausibility-checked measured temperature signals. In this way, the use of temperature signals having sources that originate outside of the hydrostatic clutch actuator 4 can be omitted entirely here, since those signals can be faulty.

REFERENCE LABELS

1 Clutch actuation system
2 Master side
3 Actuator control device
4 Clutch actuator
5 Drive
6 Piston
7 Master cylinder
8 Hydraulic fluid
9 Hydraulic line
10 Slave side
11 Slave cylinder
12 Clutch
13 Path sensor
14 Equalization tank
15 Connection opening

The invention claimed is:

1. A method for determining an actuator path of a hydraulic clutch actuator for a vehicle clutch that is closed when not actuated, comprising:
   measuring a first temperature of the hydraulic clutch actuator with a first temperature sensor wherein the first temperature sensor measures a one of a circuit board temperature, an angle sensor temperature or a pressure sensor temperature;
   measuring a second temperature of the hydraulic clutch actuator with a second temperature sensor wherein the second temperature sensor measures another one of the circuit board temperature, the angle sensor temperature or the pressure sensor temperature;
   calculating a first temperature difference between the first temperature and the second temperature;
   using the first temperature or the second temperature as a clutch actuator temperature to determine a compensation value of the actuator path when the first temperature difference is less than a threshold value; and,
   modifying the actuator path using the compensation value.

2. The method of claim 1 further comprising using the circuit board temperature to determine the compensation value of the actuator path when:
   the first temperature sensor measures the circuit board temperature, the second temperature sensor measures the angle sensor temperature, and the first temperature difference is less than the threshold value; or,
   the first temperature sensor measures the circuit board temperature, the second temperature sensor measures the pressure sensor temperature, and the first temperature difference is less than the threshold value.

3. The method of claim 1, wherein a rate of change of the clutch actuator temperature is selected to be very small when the clutch actuator temperature transitions from the circuit board temperature to the angle sensor temperature.

4. The method of claim 1, further comprising:
   measuring a third temperature of the hydraulic clutch actuator with a third temperature sensor, wherein:
      the first temperature sensor measures a circuit board temperature;
      the second temperature sensor measures an angle sensor temperature; and,
      the third temperature sensor measures a pressure sensor temperature;
   calculating a second temperature difference between the first temperature and the third temperature;
   calculating a third temperature difference between the second temperature and the third temperature;
   assigning a plausibility value to each of the first temperature, the second temperature, and the third temperature based on comparisons between the first temperature difference, the second temperature difference, and the third temperature difference, and the threshold value; and, weighting each of the first temperature, the second temperature, and the third temperature based on its respective plausibility value to determine the clutch actuator temperature.

5. The method of claim 4, wherein:
a weighting value of 0% is given to a temperature with a zero plausibility value;
a weighting value of 100% is given to a temperature with a full plausibility value; and,
a transition from 0% to 100% weighting occurs continuously.

6. The method of claim 4, wherein the weighting of the first temperature, the second temperature, or the third temperature is reduced when it is repeatedly not possible to assign a plausibility value to that temperature.

7. A method for determining an actuator path of a hydraulic clutch actuator for a vehicle clutch that is closed when not actuated, comprising:
measuring a first temperature of the hydraulic clutch actuator with a first temperature sensor;
measuring a second temperature of the hydraulic clutch actuator with a second temperature sensor;
measuring a third temperature of the hydraulic clutch actuator with a third temperature sensor, wherein:
the first temperature sensor measures a circuit board temperature;
the second temperature sensor measures an angle sensor temperature; and,
the third temperature sensor measures a pressure sensor temperature;
calculating a first temperature difference between the first temperature and the second temperature;
calculating a second temperature difference between the first temperature and the third temperature; and,
using the first temperature or the second temperature as a clutch actuator temperature to determine a compensation value of the actuator path when the first temperature difference is less than a threshold value;
using the circuit board temperature to determine the compensation value of the actuator path when:
the first temperature difference is less than the threshold value; and,
the second temperature difference is less than the threshold value; and
modifying the actuator path using the compensation value.

8. A method for determining an actuator path of a hydraulic clutch actuator for a vehicle clutch that is closed when not actuated, comprising:
measuring a first temperature of the hydraulic clutch actuator with a first temperature sensor;
measuring a second temperature of the hydraulic clutch actuator with a second temperature sensor;
calculating a first temperature difference between the first temperature and the second temperature;
using the first temperature or the second temperature as a clutch actuator temperature to determine a compensation value of the actuator path when the first temperature difference is less than a threshold value;
using an angle sensor temperature to determine the compensation value of the actuator path when:
the first temperature sensor measures the angle sensor temperature;
the second temperature sensor measures a pressure sensor temperature; and,
the first temperature difference is less than the threshold value; and
modifying the actuator path using the compensation value.

* * * * *